(12) United States Patent
Pontoppidan et al.

(10) Patent No.: US 7,752,597 B2
(45) Date of Patent: Jul. 6, 2010

(54) LAYERED SOFTWARE DEVELOPMENT AND IMPLEMENTATION USING FILES

(75) Inventors: Michael Fruergaard Pontoppidan, Lynge (DK); Boaz Lev, Redmond, WA (US); David Schaub, Vodbaek (DK)

(73) Assignee: Microsoft Corporation, Redmond, WA (US)

(*) Notice: Subject to any disclaimer, the term of this patent is extended or adjusted under 35 U.S.C. 154(b) by 1135 days.

(21) Appl. No.: 11/391,517

(22) Filed: Mar. 28, 2006

(65) Prior Publication Data

US 2007/0240096 A1    Oct. 11, 2007

(51) Int. Cl.
*G06F 9/44*    (2006.01)
(52) U.S. Cl. .................. 717/106; 717/108; 717/110; 717/113; 717/116
(58) Field of Classification Search .................. 717/106, 717/108, 110, 113, 116
See application file for complete search history.

(56) References Cited

U.S. PATENT DOCUMENTS 6,466,972 B1 * 10/2002 Paul et al. .................. 709/222
6,636,886 B1 * 10/2003 Katiyar et al. .............. 709/203
2003/0158832 A1 * 8/2003 Sijacic et al. ................ 707/1
2004/0083274 A1 * 4/2004 Katiyar et al. .............. 709/217

OTHER PUBLICATIONS

Sager, et al. "Detecting Similar Jave Classes Using Tree Algorithms", 2006, ACM, p. 65-71.*

* cited by examiner

*Primary Examiner*—Wei Y Zhen
*Assistant Examiner*—Qamrun Nahar

(57) ABSTRACT

A technology for layered software development using files is disclosed. In one method a runtime environment for a class of a layered software application is developed. A layer file folder is opened. The layer file folder is located in a computer file system and is for storing classes belonging to a layer of the layered software application. A class file is opened in the layer file folder. The class file comprises a text file representing the class of the layered software application that is being developed into a runtime environment. The class file further comprises data describing a method performed as part of the class. It is then determined if the method of the class file has been previously loaded into the runtime environment.

20 Claims, 5 Drawing Sheets

300

OPENING A LAYER FOLDER IN A COMPUTER FILE SYSTEM.
305

OPENING A CLASS FILE IN THE LAYER FOLDER, WHEREIN THE CLASS FILE COMPRISES AN EDITABLE TEXT FILE FOR STORING INFORMATION RELATED TO ANY METHODS IMPLEMENTED WITHIN A CLASS ASSOCIATED WITH THE CLASS FILE.
310

WRITING A METHOD OF THE CLASS INTO THE CLASS FILE.
315

SEQUENCING A GROUP OF LAYER FILE FOLDERS INTO AN ASCENDING HIERARCHICAL ORDER FROM A LOWEST PRECEDENCE LAYER FILE FOLDER TO A HIGHEST PRECEDENCE LAYER FILE FOLDER.
405

OPENING A LAYER FILE FOLDER, WHEREIN THE LAYER FILE FOLDER IS FOR STORING CLASSES BELONGING TO A LAYER OF A LAYERED SOFTWARE APPLICATION.
410

OPENING A CLASS FILE IN THE LAYER FOLDER, WHEREIN THE CLASS FILE COMPRISES A TEXT FILE REPRESENTING A CLASS OF THE LAYERED SOFTWARE APPLICATION, AND WHEREIN THE CLASS FILE COMPRISES DATA DESCRIBING A METHOD PERFORMED AS PART OF THE CLASS.
415

DETERMINING IF THE METHOD OF THE CLASS FILE HAS BEEN PREVIOUSLY LOADED INTO THE RUNTIME ENVIRONMENT.
420

FIG. 4

LAYERED SOFTWARE DEVELOPMENT AND IMPLEMENTATION USING FILES

BACKGROUND

Various embodiments are generally directed to software development in computers, and more specifically, to a technology for layered software development and implementation using files.

Runtime versions of large software applications, such as business software suites, are often compiled into a large piece of binary code. This large piece of binary code is, by design, difficult to modify so that the runtime version of the business software suite is more secure and harder to tamper with.

During development, however, large software applications, such as business software suites, are often divided up into well known programming structures called classes, each of which performs a specific category of functions. For example, in a business software suite, there are software functions for performing inventory, costing, accounting, invoicing, and etc. A single one of these functions, such as invoicing, can be represented as a class comprised of one or more methods that are used to perform the invoicing function assigned to the class.

Subdivision of a large software application into classes and methods is often used to speed the development process. Use of classes allows a large software application to be segmented into smaller parts of code, which can be independently developed and validated in isolation from the remainder of the application.

Subdivision of a large software application into classes and methods also aids in the customization process. For instance, in the example of a business software suite, a standard software application is developed and shipped. However, because the various end users of the business software suite have differing needs, the functions of the standard business software suite are often tailored for the use of the particular end user. This tailoring is simplified through the use of classes, because it is limited to altering code of a method or methods in one or more classes, rather than customizing the underlying code of the entire business software suite.

Presently such classes and methods are stored within a database that forms part of the business software suite. Accessing and altering the content of these classes and methods thus requires the use of database tools. Additionally, such databases are often configured in a proprietary format, and thus, the data representing the classes and methods can only be accessed and altered with specialized database tools. Performing a modification, either during development or for end user customization, requires accessing the data of a class within the database. One or more methods in the class are then modified. The modified class data is then saved in the database, in place of the old class data. The business software suite is then recompiled into a runtime version.

A large application, such as a business software suite, may have millions of lines of underlying code. Thus, recompiling all of the code into a runtime version can take hours. This is tedious and slows the development and modification process. Further, a database is cumbersome and requires the use of specialized database editing tools and methods. A database also affords little or no visibility of class metadata, such as: when changes were made, why changes were made, or who made changes. Thus, version control is hard to implement or non-existent when class data is stored in a database. Additionally, there is no granularity in a database, only a giant file for storing all of the classes. This means that altering a single class alters the entire database file.

While subdividing functions of a large program into classes is useful for simplifying development and modification, it is apparent that the above described methods can be cumbersome, frustrating, and inefficient.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A technology for layered software development and implementation using files is disclosed. In one method approach, software representing unique methods performed by a class, in a particular layer of a layered software application, is stored within a text file. The text file is called a class file and is stored within a layer folder. There can be numerous layer folders, each representing a unique version or build of the layered software application. Each layer folder incorporates data indicating its precedence in relationship to other layer folders, such that all layer folders can be arranged in a hierarchical order. A class file for a particular class can be stored in more than one of the numerous layer folders. Each class file in a layer folder is configured for storing methods that are unique to the particular layer of the layered software application that the layer folder is associated with.

To create a runtime environment for a particular class, each layer folder is opened and searched for a particular class file corresponding to the runtime class being created. Methods within these particular class files are read. If a method that is read is determined to not yet exist in the runtime class, it is loaded into the runtime class. If a method that is read is determined to already exist in the runtime class, the existing method in the runtime class is overridden in the runtime class with the newly read method when the newly read method is from a higher precedence layer folder than the existing method. In this way, the runtime environment for a class is created from the highest precedence version of all methods of a class, as loaded from particular class files stored in a plurality of layer folders.

DESCRIPTION OF THE DRAWINGS

The accompanying drawings, which are incorporated in and form a part of this specification, illustrate embodiments of the technology for layered software development and implementation using files and, together with the description, serve to explain principles discussed below:

FIG. 3 is a flow diagram of operations performed in accordance with one embodiment of the present technology for layered software development and implementation using files FIG. 4 is a flow diagram of operations performed in accordance with one embodiment of the present technology for layered software development and implementation using files.

The drawings referred to in this description should be understood as not being drawn to scale except if specifically noted.

DETAILED DESCRIPTION

Reference will now be made in detail to embodiments of the present technology for identifying design issues in electronic forms, examples of which are illustrated in the accompanying drawings. While the technology for layered software development and implementation using files will be described in conjunction with various embodiments, it will be understood that they are not intended to limit the present technology for layered software development and implementation using files to these embodiments. On the contrary, the presented technology for layered software development and implementation using files is intended to cover alternatives, modifications and equivalents, which may be included within the spirit and scope the various embodiments as defined by the appended claims. Furthermore, in the following detailed description, numerous specific details are set forth in order to provide a thorough understanding of the present technology for layered software development and implementation using files. However, the present technology for layered software development and implementation using files may be practiced without these specific details. In other instances, well known methods, procedures, components, and circuits have not been described in detail as not to unnecessarily obscure aspects of the present embodiments.

Unless specifically stated otherwise as apparent from the following discussions, it is appreciated that throughout the present detailed description, discussions utilizing terms such as "opening", "determining", "sequencing", "reading", "loading", "overriding", "writing", "creating", "including", "comparing", "receiving", "providing", "generating", "associating", and "arranging", or the like, refer to the actions and processes of a computer system (such as computer 100 of FIG. 1), or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The present technology for layered software development and implementation using files is also well suited to the use of other computer systems such as, for example, optical and mechanical computers. Additionally, it should be understood that in embodiments of the present technology for layered software development and implementation using files, one or more of the steps can be performed manually.

Example Computer System Environment

Figure 1:
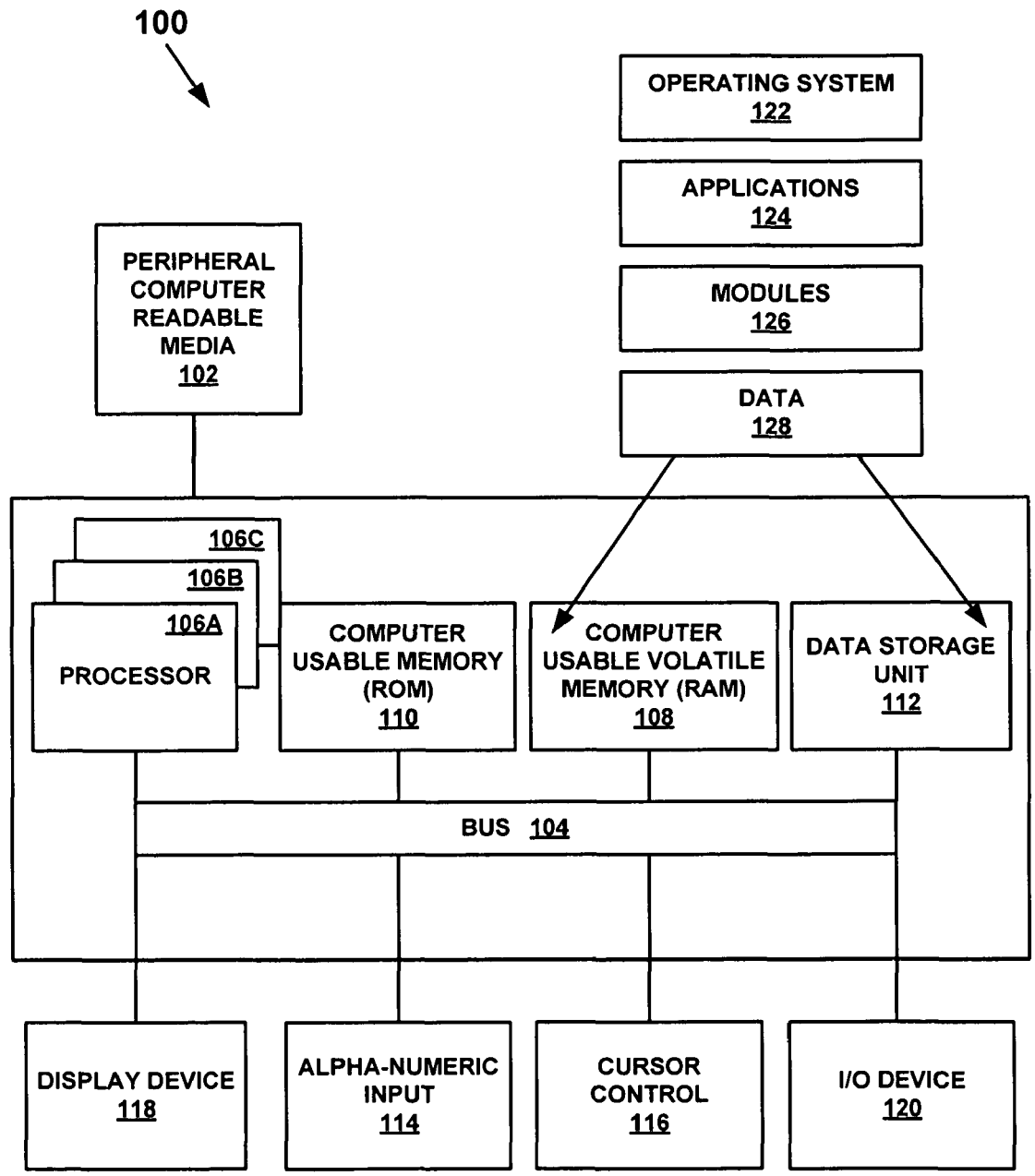
FIG. 1 is a diagram of an exemplary computer system used in accordance with embodiments of the present technology for layered software development and implementation using files.

With reference now to FIG. 1, portions of the technology for layered software development and implementation using files are composed of computer-readable and computer-executable instructions that reside, for example, in computer-usable media of a computer system. That is, FIG. 1 illustrates one example of a type of computer that can be used to implement embodiments, which are discussed below, of the present technology for layered software development and implementation using files. FIG. 1 illustrates an exemplary computer system 100 used in accordance with embodiments of the present technology for layered software development and implementation using files. It is appreciated that system 100 of FIG. 1 is exemplary only and that the present technology for layered software development and implementation using files can operate on or within a number of different computer systems including general purpose networked computer systems, embedded computer systems, routers, switches, server devices, client devices, various intermediate devices/nodes, stand alone computer systems, and the like. As shown in FIG. 1, computer system 100 of FIG. 1 is well adapted to having peripheral computer readable media 102 such as, for example, a floppy disk, a compact disc, and the like coupled thereto.

System 100 of FIG. 1 includes an address/data bus 104 for communicating information, and a processor 106A coupled to bus 104 for processing information and instructions. As depicted in FIG. 1, system 100 is also well suited to a multi-processor environment in which a plurality of processors 106A, 106B, and 106C are present. Conversely, system 100 is also well suited to having a single processor such as, for example, processor 106A. Processors 106A, 106B, and 106C may be any of various types of microprocessors. System 100 also includes data storage features such as a computer usable volatile memory 108, e.g. random access memory (RAM), coupled to bus 104 for storing information and instructions for processors 106A, 106B, and 106C. System 100 also includes computer usable non-volatile memory 110, e.g. read only memory (ROM), coupled to bus 104 for storing static information and instructions for processors 106A, 106B, and 106C. Also present in system 100 is a data storage unit 112 (e.g., a magnetic or optical disk and disk drive) coupled to bus 104 for storing information and instructions. System 100 also includes an optional alphanumeric input device 114 including alphanumeric and function keys coupled to bus 104 for communicating information and command selections to processor 106A or processors 106A, 106B, and 106C. System 100 also includes an optional cursor control device 116 coupled to bus 104 for communicating user input information and command selections to processor 106A or processors 106A, 106B, and 106C. System 100 of the present embodiment also includes an optional display device 118 coupled to bus 104 for displaying information.

Referring still to FIG. 1, optional display device 118 of FIG. 1, may be a liquid crystal device, cathode ray tube, plasma display device or other display device suitable for creating graphic images and alphanumeric characters recognizable to a user. Optional cursor control device 116 allows the computer user to dynamically signal the movement of a visible symbol (cursor) on a display screen of display device 118. Many implementations of cursor control device 116 are known in the art including a trackball, mouse, touch pad, joystick or special keys on alpha-numeric input device 114 capable of signaling movement of a given direction or manner of displacement. Alternatively, it will be appreciated that a cursor can be directed and/or activated via input from alpha-numeric input device 114 using special keys and key sequence commands. System 100 is also well suited to having a cursor directed by other means such as, for example, voice commands. System 100 also includes an I/O device 120 for coupling system 100 with external entities. For example, in one embodiment, I/O device 120 is a modem for enabling wired or wireless communications between system 100 and an external network such as, but not limited to, the Internet.

Referring still to FIG. 1, various other components are depicted for system 100. Specifically, when present, an operating system 122, applications 124, modules 126, and data 128 are shown as typically residing in one or some combination of computer usable volatile memory 108, e.g. random access memory (RAM), and data storage unit 112. In one embodiment, the present technology for layered software development and implementation using files, for example, is stored as an application 124 or module 126 in memory locations within RAM 108 and memory areas within data storage unit 112

General Description of the Technology for Layered Software Development and Implementation using Files As an overview, in one embodiment, the present technology for layered software development and implementation using files is directed towards storing a class of a software development layer. A portion of code is received for storage. The portion of code represents a method or methods performed by as software class in a particular layer. A layer folder is opened in a computer file system. The layer folder is associated with the software layer of the portion of code being stored. A class file is then opened in the layer folder. The class file comprises an editable text file for storing information related to any method or methods implemented within the class. A method of the class is then written into the text file. The method comprises a unit of the previously described software instructions that are performed as part of the previously described class. In one embodiment, the method is only written into the class file if the method differs from all lower layer methods stored in the computer file system. Other embodiments of the present technology are directed towards developing a runtime environment for a particular class from method information stored as part of the particular class in one or more layer folders.

Exemplary System

Figure 2:
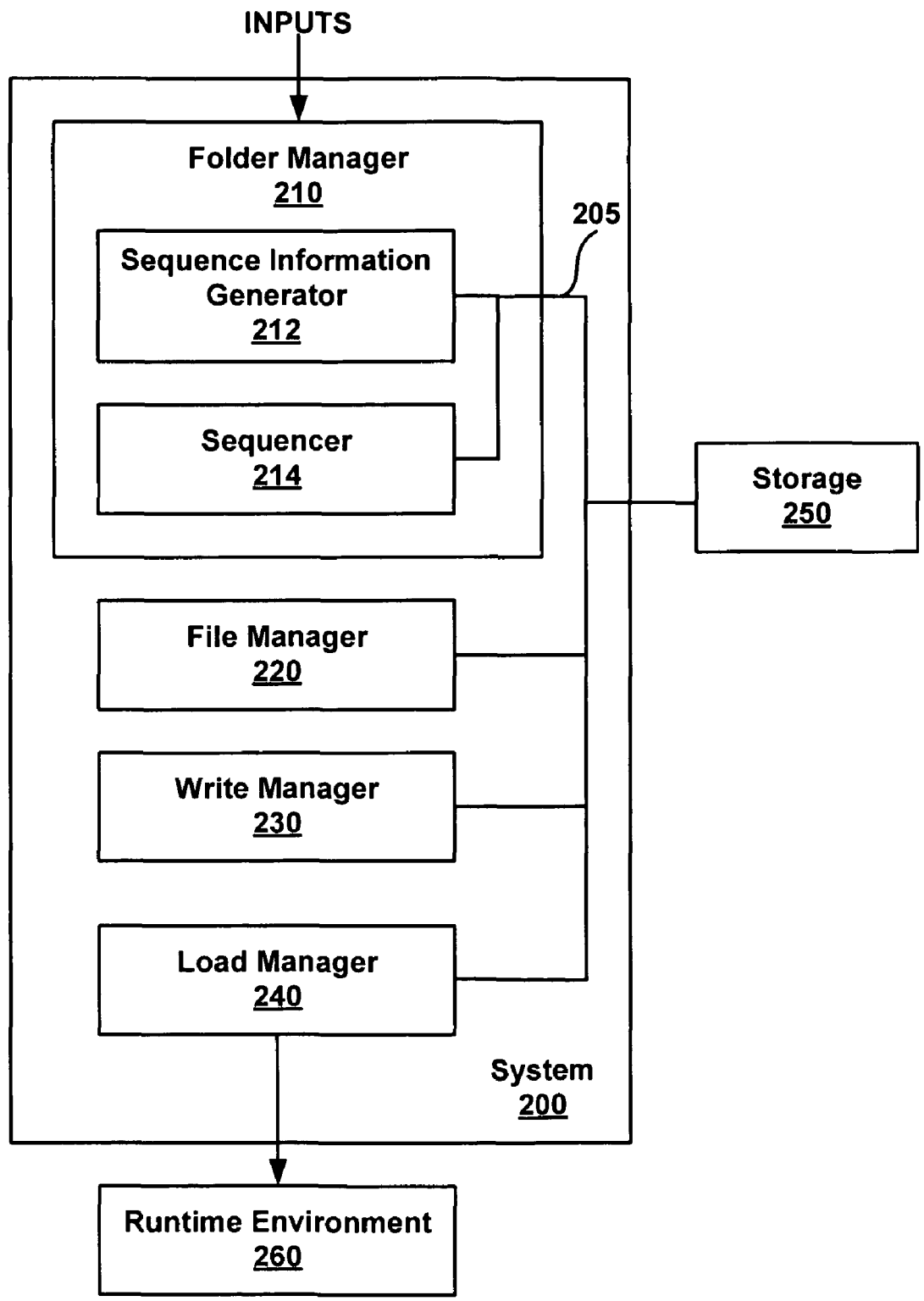
FIG. 2 is a diagram of one embodiment of the present system for layered software development and implementation using files.

With reference now to FIG. 2, a diagram of one embodiment of the present system 200 for layered software development and implementation using files is shown. The following discussion will begin with a description of the physical structure of the present system 200 for layered software development and implementation using files. This discussion will then be followed with a description of the operation of the present technology.

With respect to the physical structure, system 200 is comprised of a folder manager 210, a file manager 220, a write manager 230, a load manager 240, and a bus 205. Inputs to system 200, such instructions and portions of software code from a layered software application, are received in folder manager 210, which couples inputs to other portions of system 200 as required.

Folder manager 210 opens file folders for reading and writing operations performed by system 200. Folder manager 210 is also comprised of sequence information generator 212 and sequencer 214. Sequence information generator 212 generates unique sequence information for each file folder opened by folder manager 210. Sequencer 214 utilizes this unique sequence information to arrange file folders in a hierarchical order. File manager 220 opens files within file folders created by folder manager 210. File manager 220 opens these files for reading and writing operations performed by system 200. Write manager 230 is writes information into files that are created by file manger 220. The information written into a file comprises software code, such as methods, associated with a class of a particular software layer. Load manager 240 reads information written within files that are managed by system 200. In one embodiment, load manager 240 utilizes information from sequencer 214 to read from layer file folders in a hierarchical order. Load manager 240 is coupled to runtime environment 260. Load manager 240 selectively outputs information, read from files managed by system 200, to runtime environment 260. Bus 205 couples folder manager 210, file manager 220, write manager 230 and load manager 240 to one another and to storage 250.

Storage 250 is, in one embodiment, a computer useable memory (110, 108 of FIG. 1), a data storage unit (112 of FIG. 1), a storage area coupled as an I/O device (120 of FIG. 1), or some similar device. Storage 250 is useable by system 200 to store files and folders in a commonly known and understood format. Typical commonly known and understood formats include but are not limited to the folder and file format structure commonly used by personal computers to store and organize data, such as word processor files or text files upon storage disks.

In one embodiment of the present technology for layered software development and implementation using files, runtime environment 260 is an environment where a software application or portions of a software application are executed for design, test, and use. Runtime environments, such as runtime environment 260, are commonly known in the art of computer programming. Runtime environment 260 receives portions of code for layered software applications from load manager 240. In some embodiments, runtime environment 260 executes this code directly. In other embodiments runtime environment 260 compiles the received and then executes it.

Exemplary Methods of Operation

The following discussion sets forth in detail the operation of present technology for layered software development and implementation using files. With reference to FIGS. 3 and 4, flow diagrams 300 and 400 each illustrate exemplary steps used by various embodiments of the present technology for layered software development and implementation using files. Flow diagrams 300 and 400 include processes that, in various embodiments, are carried out by a processor under the control of computer-readable and computer-executable instructions. The computer-readable and computer-executable instructions reside, for example, in data storage features such as computer usable volatile memory 108, computer usable non-volatile memory 110, and/or data storage unit 112 of FIG. 1. The computer-readable and computer-executable instructions are used to control or operate in conjunction with, for example, processor 106A and/or processors 106A, 106B, and 106C of FIG. 1. Although specific steps are disclosed in flow diagrams 300 and 400, such steps are exemplary. That is, embodiments are well suited to performing various other steps or variations of the steps recited in flow diagrams 300 and 400. It is appreciated that the steps in flow diagrams 300 and 400 may be performed in an order different than presented, and that not all of the steps in flow diagrams 300 and 400 may be performed.

FIG. 3 is a flow diagram 300 of operations performed in accordance with one embodiment of the present technology for layered software development and implementation using files. More specifically, FIG. 3 illustrates a flow diagram 300 of an exemplary embodiment of a method for storing a class of a software development layer. Elements of flow diagram 300 are described below in conjunction with reference to portions of system 200 of FIG. 2.

At step 305 of flow diagram 300, the present technology for layered software development and implementation using files opens a layer folder in a computer file system. In the present embodiment, a layer folder is opened in storage 250 in response to instructions received by system 200 to store a class of a software development layer. In the present technology, a layer folder is a file folder as is commonly known and used in folder and file storage systems utilized, for example, with personal computers. In an embodiment of the present technology where the layer folder already exists, folder manager 210 opens it. This allows file manager 220 to access any existing files within the opened layer file folder. Opening an existing layer file folder with folder manager 210 also enables file manager 220 to store new files within the layer file folder as required. In an embodiment of the present technology where the layer folder does not exist, folder manager 210 creates it and opens it so files can be stored within it by file manager 220. The operation of folder manager 210 is described in detail below.

In one embodiment of the present technology for layered software development and implementation using files, folder manager 210 is coupled to storage 250 and other elements of system 200 via bus 205. Folder manager 210 manages and performs aspects related to the opening of file folders for performing reading and writing operations. In various embodiments of the present technology, such aspects include opening file folders, and when necessary, creating and naming file folders. One type of file folder that folder manager 210 opens is called a "layer folder" or "layer file folder." In the present technology, a layer file folder is utilized for storing information, such as files, related to a particular layer of a layered software application.

The present technology for layered software development and implementation using files neatly organizes layer file folders in an easily accessible format. In addition, the present technology neatly separates layers and classes of a layered software development from one another, instead of conglomerating them into a giant file or database. The present technology also increases the granularity and visibility of software layers and classes the development process, by organizing portions of code into layer file folders and class files. Additionally, the present technology allows metadata storage or association with layer file folders when modifications to files are folders are made. The present technology also streamlines organization and version control during software development and modification. In one embodiment this streamlining comprises storing all layer specific information, such as files that are related to a particular software layer, within a common layer folder for each particular software layer. This organized storing technique of the present technology presents portions of software code in a folder and file format that allows common file access tools to be used to manipulate files and folders which contain software code information.

In the present technology for layered software development and implementation using files, folder manager 210 also receives inputs to system 200. In the present technology, inputs received at folder manager 210 comprise, for example: instructions to store information into folders and files; portions of program code from a layered software application to be stored into folders and files; instructions to read information from folders and files; and instructions to output information from folders and files into a runtime environment. In one embodiment, folder manager 210 is also comprised of sequence information generator 212 and sequencer 214, which are utilized to perform other functions of folder manager 210.

TABLE 1

Exemplary Layer File Folders in a Storage Area c:\Layer1
c:\Layer2

Table 1 illustrates two exemplary layer file folders opened using an embodiment of the present technology. The layer folders of Table 1 are opened, for instance, on a disk drive of computer 100 (FIG. 1). The layer file folder named "Layer1", represents a first layer of a layered software application. The layer file folder named "Layer2" represents a second layer of a layered software application.

Referring again to FIG. 3, in one embodiment of the present technology for layered software development and implementation using files, step 305 comprises including layer sequence information in a layer file folder that is opened. Sequence information generator 212 is utilized to include layer sequence information in a layer file folder that is opened in 305 by folder manager 210.

In one embodiment of the present technology for layered software development and implementation using files, sequence information generator 212 is coupled to storage 250 and other elements of system 200 via bus 205. Sequence information generator 212 generates and associates layer sequence information, such as a number or logical file name, with each layer file folder managed by folder manger 210. In one embodiment of the present technology, the layer sequence information represents a hierarchical layer of a layered software application that a particular layer file folder is associated with. One embodiment of the present technology associates a layer sequence number with each layer file folder to streamline version control. In another embodiment of the present technology, sequence information generator 212 associates a logical layer name with each layer file folder to streamline version control. In one such embodiment, for instance, the "system" layer of software is associated with the lowest hierarchical priority of all layers while the "user" layer of software is associated with the highest hierarchical priority of all layers. Other embodiments utilize a combination of sequence numbers and logical layer names to provide yet more stratification to layer file folders. In one embodiment, for instance, the present technology uses layer file folder names to associate layer file folders with a particular layer of a layered software application.

By way of example, in one embodiment, folder manager 210 incorporates a sequence number associated with each layer file folder into folder information, such as the name of the layer file folder. As shown in Table 1, layer file folder "Layer1" has had a sequence number of "1" automatically inserted into its folder name. Likewise, in Table 1, layer file folder "Layer2" has had a sequence number of "2" inserted into its folder name. Similarly, in an embodiment utilizing logical layer names, folder manager 210 incorporates a logical layer name into folder information, such as the name of the layer file folder. For instance, in one embodiment utilizing logical layer names, "Layer1" of Table 1 is instead represented as "LayerSYS" to associate it with a system layer, while "Layer2" of Table 1 is instead represented as "LayerUSR", to associate it with a user layer. In one embodiment, sequence information is also optionally associated with or included within any files stored within a particular layer file folder. By incorporating sequence information into layer file folder names and file names, the present technology thus enables a folder or file to be associated with a particular layer of a layered software application regardless of where it is later moved to or stored. This association created by the present technology also streamlines version control by identifying the layer that a folder or file is associated with. Additionally, in one embodiment, sequence information associated with a layer file folder or file is optionally stored in a memory. In such an embodiment the associated sequence information may not be inserted into the name of the layer file folder or file.

In one embodiment of the present technology, sequence information generator 212 automatically generates sequence numbers for association with layer file folders. By way of example, in one such embodiment, the sequence numbering for a particular set of layer file folders starts at an arbitrary or designated starting number. Sequence information generator 212 automatically associates this starting number with the first, or lowest precedence, layer file folder. Sequence information generator 212 then increments the starting number, and automatically associates it with the next layer file folder in an ascending hierarchical sequence of precedence. Sequence information generator 212 repeats this process for additional layer file folders in the ascending hierarchical sequence of precedence. In another embodiment, sequence information generator 212 generates the sequence number for each folder from an input, such as a user input or data contained within an instruction to open a layer file folder.

In one embodiment of the present technology for layered software development and implementation using files, sequencer 214 is coupled to storage 250 and other elements of system 200 via bus 205. Sequencer 214 arranges a plurality of layer file folders into a hierarchical order by means of layer sequence information associated with each layer file folder, such as a sequence number or logical layer name. Sequencer 214 references sequence information associated with layer file folders. Sequencer 214 utilizes this sequence information to create a hierarchical ordering of layer file folders within a memory or within storage area 205. An ascending hierarchical ordering is one example of a hierarchal ordering arranged by sequencer 214. In such an ascending hierarchical ordering, layer file folders of a layered software application are arranged from a lowest precedence layer file folder to a highest precedence layer file folder. Such sequencing allows folder manager 210 to open managed layer file folders iteratively, in an orderly sequence provided by sequencer 214. This sequential opening is useful version control tool, for example, when loading information into runtime environment 260 with load manager 240.

Referring again to flow diagram 300 of FIG. 3, at step 310, the present technology for layered software development and implementation using files opens a class file in the layer folder opened as part of step 305. The class file comprises an editable text file for storing information related to any methods implemented within the class of the software development layer that is being stored in the class file. In the present embodiment, a class file is opened in response to instructions received by system 200 to store a class of a software development layer. In the present technology, a class file is formatted as a text file. Such text file formats are commonly known and used in folder and file storage systems utilized, for example, with personal computers. The present technology thus enables commonly used text editing utilities to open, read, and manipulate information stored within a class file. In an embodiment of the present technology where the class file already exists, file manager 220 opens the class file so that class information can be stored within it. In an embodiment of the present technology where the required class file does not exist within a class folder, file manager 220 creates it and then opens it so that class information can be stored within it.

In one embodiment, a file manager 220 or write manager 230 stores a class header in the class file when it is opened to store new information. The class header stored by the present technology comprises identifier information for the class. Table 2 shows exemplary class header information that is stored in a class file in one embodiment of the present technology. Arrows point to elements of the class header and provided descriptive information. As shown in Table 2, in one embodiment, class header information comprises: the file format version of an application that the class is designed to run with; a tag indicating that the file contains a class; export information indicating the version number of the class; and class identification number for uniquely identifying the class to system 200. Table 2 also shows that class header information stored by the present technology also comprises property information about the class, such as: the name of the class, the base class, and the tier to run the class on. In some embodiments, class header information also comprises metadata (not shown in Table 2), such as: date modified, reason modified, person performing the modification, or other similar information. File manager 220, is utilized to open a class file, and is described in detail below.

TABLE 2

Exemplary Class Header Stored in a Class File

Exportfile for AOT version 1.0 or later
Formatversion: 1                    ← File format version
***Element: CLS                     ← It is a class
; Business Solutions Suite-ProductX Class: ApplicationVersion unloaded
; ------------------------------------------------------------------
    CLSVERSION 1                    ← Class export format version
    CLASS #ApplicationVersion       ← Name of class
        Id 758                      ← Class ID (Only needed in our system)
        PROPERTIES
            Name       #ApplicationVersion  ← Name (again)
            Extends    #                    ← baseclass (Polymorphism)
            RunOn      #Called from         ← Tier to run the class on
        ENDPROPERTIES In one embodiment of the present technology for layered software development and implementation using files, file manager 220 is coupled to storage 250 and other elements of system 200 via bus 205. File manager 220 opens files within layer file folders that are opened by folder manager 210. File manager 220 manages and performs aspects related to the opening of files for reading and writing operations. In one embodiment, aspects include the opening files, and when necessary, the creating and naming files. One type of file that file manager 220 opens is called a "class file." In the present technology, a class file is a text file utilized for storing class information.

In the present technology, class information stored in a class file is comprised of software code implemented in a particular software layer. The software layer is associated with the layer file folder the class file is stored within. Class information is written into a class file by write manager 230 from textual information supplied as an input to folder manager 210. Writing in a class file is the act of actually recording or storing data within the file so that the data can be accessed at a future time by a reading from the class file. In one embodiment, as part of the file opening process, file manager 220 reads a portion of the textual class information and utilizes it to automatically create a file name for a class file. In one embodiment, file manager 220 stores class header information into the opened class file, or else employs write manager 230 to write this information. In the present technology, class header information, comprises identifier information for the class that is common to all methods written into the class file.

File manager 220 improves version control by storing class files in an organized fashion within the particular layer file folders the class files are associated with. This storage technique of the present technology enables common file access tools to manipulate files and folders that contain organized portions of a layered software development application. For instance, a layer folder can be copied to another location within a computerized file system, or a class file can be coupled as an attachment to an e-mail message. In this manner, the present technology allows small portions software from a larger layered software application to be easily separated, manipulated, and shared. The present technology also allows metadata such as date modified, time modified, or reason for modification to be stored in or associated with a class file.

TABLE 3

Exemplary Class File within Layer File Folders c:\Layer1\MyClass1.txt
c:\Layer1\MyClass2.txt
c:\Layer1\MyClass3.txt
c:\Layer2\MyClass1.txt
c:\Layer2\MyClass5.txt Table 3 illustrates exemplary use of the present technology to open class files within the layer files previously shown in Table 1. In Table 3, note that the class file "MyClass1.txt" exists in both layer file folders. This is permitted, as the contents of the class files are linked to different layers, or versions, of a layered software application.

Referring again to flow diagram 300 of FIG. 3, at step 315, the present technology for layered software development and implementation using files writes a method into the class file opened as part of step 310. Writing comprises the act of actually storing or recording data into a class file so that it can be read from the class file at some future time. The method that is written into the class file is part of the class of a software development layer that is being stored by the operation of flow diagram 300. In one embodiment, all methods within the class being stored are written into the class file. In another embodiment, a method of a class is only written into the class file if it differs from all lower layer methods stored in the computer file system managed by folder manager 210.

Write manager 230 is used to write methods and other class information as part of step 315. Write manager 230 is also used to make determinations about what class information is written into a class file as part of step 315. The operation of write manager 230 is described in detail below.

In one embodiment of the present technology for layered software development and implementation using files, write manager 230 is coupled to storage 250 and other elements of system 200 via bus 205. Write manager 230 writes textual information into class files. The textual information written by write manager 230 defines each method implemented within the software application class, and associated class file, that the method is a part of. Textual information written by write manager 230 comprises class information, such as: class header information that identifies and defines a formalized structure of operation for any methods implemented within the software class; software code information detailing the functioning of any method implemented within the class; and software code for any methods implemented as part of the software class. In one embodiment, textual information written by write manager 240 into a class file also comprises metadata about the class file. Folder manager 210 receives class information as an input and passes it to write manager 230 for writing into a class file. Write manager 230 also optionally writes other information into class a class file. An example of other information is information generated by file manager 220 or folder manager 210, such as layer sequence information, other class identifier information, or metadata.

In one embodiment, write manager 230 writes all method information that is received as part of a class of a software development layer to be stored. In another embodiment, write manager 230 determines which of the received methods should be written into the class file of a class of a software application layer being stored. For instance, in one embodiment, method information is only written into a class file by write manager 230 if the method information differs from all lower layer methods stored in the computer file system managed by folder manager 210.

In such an embodiment, write manager 230 analyzes each method received as part of a class to determine if the method differs from all lower layer methods of the class. Write manager 230 uses sequence information from sequencer 214 to determine which layer folders have a lower precedence than the layer folder currently being written in. File manager 220 then opens equivalent class files, if they exist. Write manager 230 compares method identifier information from the method currently being written, with method identifier information from all lower layer methods recorded as part of equivalent classes. In Table 3, the two instances of "MyClass1" are an example of equivalent class files existing in two different layer file folders. If write manager 230 finds no matching method identifier information in a lower layer method, it deems the method being analyzed is to be a new method for the class, and writes it into the class file. If write manager 230 finds one or methods with matching identifier information in lower layer class files, then it compares the content or metadata of the method being analyzed to any matching methods. If write manager 230 determines the analyzed method is a different version of the method, as a result of the comparison, it writes this version into the class file. If write manager 230 finds the analyzed method to be the same as a previously saved method, it does not save the method in the class file.

FIG. 4 is a flow diagram 400 of operations performed in accordance with one embodiment of the present technology for layered software development and implementation using files. More specifically, FIG. 4 illustrates a flow diagram 400 of an exemplary embodiment of a method for generating a runtime environment for a class of a layered software application. Elements of flow diagram 400 are described below in conjunction with reference to portions of system 200 of FIG. 2.

At step 405 of flow diagram 400, the present technology for layered software development and implementation using files sequences a group of layer file folders into an ascending hierarchical order from a lowest precedence layer file folder to a highest precedence layer file folder. This sequencing is optional, for instance, in embodiments where it has already been performed or in an embodiment that does not rely on opening files in sequence to build a runtime environment. When utilized, this sequencing of layer file folders is performed by sequencer 214 as previously described. In one embodiment, folder manager 210 organizes layer file folders in storage 250 according to this sequencing. In another embodiment, this sequencing is associated with layer file folders, and the association is stored in a memory and provided as required to other portions of system 200.

At step 410 of flow diagram 400, the present technology for layered software development and implementation using files opens a layer file folder. The layer file folder is located in a computer file system, and is used by the present technology for storing classes belonging to a layer of the layered software application for which a runtime class is being developed. The layer file folder is opened so that information from class files stored within it can be analyzed and selectively loaded in to the runtime environment being developed. Folder manager 210, previously described, is utilized to open an existing layer file folder in conjunction with step 405 so that contents of the existing layer file folder can be analyzed.

In one embodiment, where a group of layer folders has a hierarchical order of precedence, the layer file folders are opened in an ascending sequence from lowest precedence to highest precedence. Information from sequencer 214 (previously described) is utilized by folder manager 210 to determine such a hierarchical sequence, so that individual layer file folders in a group of layer file folders can be opened in an ascending order.

At step 415 of flow diagram 400, the present technology for layered software development and implementation using files opens a class file in the layer folder that was opened in step 410. The class file that is opened comprises a text file representing the class of said layered software application that the runtime environment is being developed for. The class file comprises data describing a method performed as part of the class. File manager 220 (previously described) receives input regarding the class runtime environment being developed. File manager 220 utilizes the information received to select a class file associated with the runtime from the opened layer file folder. If no such class file exists in the opened layer file folder, this information is passed to folder manager 210, so that another layer file folder can be opened.

At step 420 of flow diagram 400, the present technology for layered software development and implementation using files determines if a method of the class file opened by step 410 has been previously loaded into the runtime environment that is being developed. This determining is done by load manager 240.

In one embodiment of the present technology for layered software development and implementation using files, load manager 240 is coupled to storage 250 and other elements of system 200 via bus 205. Load manager 240 is also coupled to runtime environment 260 for outputting class and method information to runtime environment 260 from folders and files in storage 250 that are managed by system 200. Operations of load manager 240 are directed by inputs received at folder manager 210 and then forwarded to load manager 240. Based on a received input, such as an input to load a particular class into a runtime environment, load manager 240 reads a portion of textual information stored within class files of layer file folders. Reading data within a class file allows load manager 240 to ascertain the contents of the class file, such as the methods that are stored in a class file. Load manager 240 then determines which information in a class file, such as any methods from a group of methods in a class file, should be loaded into a runtime environment being developed. Load manager 240 then selectively provides outputs from system 200 to runtime environment 260, from the textual information that is read from the class files.

In one embodiment, load manager 240 loads all method information in each class into the runtime environment 260. In another embodiment, load manager 240 selectively determines, for instance from a cached history, if a method being loaded into runtime environment 260 has been previously loaded. If a method has not previously been loaded, load manager 240 loads the method into runtime environment 260 as a new method. If a method has previously been loaded, load manager 240 overrides the previously loaded version of the method with the new version of the method, when the previously loaded version of the method is from a lower precedence layer of a layered software application. In an embodiment where layer file folders are being opened in an ascending sequence, load manager 240 automatically overrides a previously loaded method with an equivalent method, since by default it is from a lower precedence layer. In an embodiment, where layer file folders are not being opened in an ascending sequence, load manager 240 compares the precedence of the layer file folders that the methods in question were read from. Load manager 240 then loads the method from the highest precedence folder into runtime environment 260.

Figure 5:
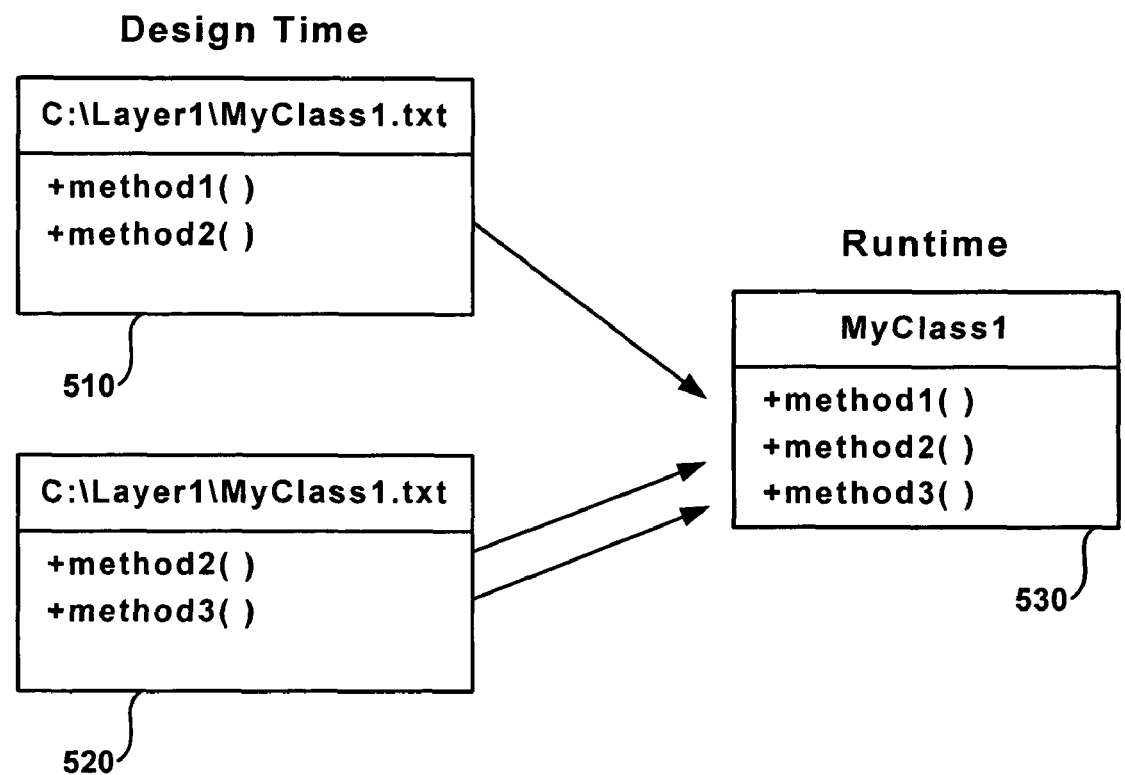
FIG. 5 is a representation of design time class files of a layered software application being loaded into a runtime class in accordance with one embodiment of the present system for layered software development and implementation using files.

FIG. 5 is a representation of design time class files of a layered software application being loaded into a runtime class in accordance with one embodiment of the present system for layered software development and implementation using files. In FIG. 5, the design time layer files 510 and 520 represent exemplary methods stored in the "MyClass1" class file of Table 1 and Table 3. Methods in these "MyClass1" class files are utilized to create a runtime 530 of the methods of the class "MyClass1". The contents of the "Layer 1" layer file folder version of "MyClass1" are shown by design time 510. The contents of the "Layer2" layer file folder version of "MyClass1" are shown by 520. According to one embodiment of the present technology, load manger 240 first reads the contents of the "MyClass1" file shown in design time 510 because it has a lower hierarchical precedence than the "MyClass1" file shown in design time 520. Load manager 240 then loads "Method1" and "Method2" from design time 510 into the runtime 530 of MyClass. Load manager 240 then reads the contents shown in design time 520. Load manager 240 notes that "Method2" has previously been loaded into runtime 530. Since layer file folders are being read from in ascending order of precedence, load manager 240 overrides the previously loaded version of "Method2" with the version of "Method2" stored in design time 520. Next load manager 240 loads "Method3" from design time 520 into runtime 530. The final version of runtime 530 is comprised of "Method1" from design time 510, "Method2" from design time 520, and "Method 3" from design time 530.

Exemplary embodiments and advantages of the present technology for layered software development and implementation using files is thus described. Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-readable medium containing instructions that, when executed, cause a computer system to perform steps comprising:
receiving a portion of code representing a method performed by a class of a layered software application that is being developed into a runtime environment;
receiving instructions for storing said class of said layered software application;
opening a layer folder in a computer file system, wherein said layer folder is associated with a software development layer of said layered software application, said software development layer representing a unique version of said layered software application;
opening a class file stored in said layer folder, wherein said class file represents said class of said layered software application and comprises an editable text file for storing information related to any methods implemented within said class; and
writing said portion of code representing said method of said class into said class file of said layer folder, wherein said method is to be performed as part of said class in said software development layer.

2. The instructions of claim 1, wherein said opening a layer folder in a computer file system comprises:
creating said layer folder if said layer folder does not exist.

3. The instructions of claim 2, further comprising:
including layer sequence information in said layer folder.

4. The instructions of claim 1, wherein said opening a class file in said layer folder comprises:
creating said class file if said class file does not exist in said layer folder.

5. The instructions of claim 1, wherein said opening a class file in said layer folder comprises:
writing a class header in said class file, said class header comprising identifier information for said class.

6. The instructions of claim 1, wherein said writing said portion of code representing said method of said class into said class file comprises:
determining if said method differs from all lower layer methods of said class by comparing method identifier information from said method with method identifier information of all said lower layer methods.

7. The instructions of claim 6, further comprising:
writing said method into said class file if no matching method identifier information exists in any of said lower layer methods.

8. The instructions of claim 6, further comprising:
comparing content of said method with all said lower layer methods of said class determined to have matching method identifier information to said method; and
writing said method into said class file if, as a result of said comparing content, said method is determined to comprise different content than all said lower layer methods determined to have matching method identifier information to said method.

9. A computer implemented process for generating a runtime environment for a class of a layered software application, said process comprising:
opening a layer file folder, wherein said layer file folder is located in a computer file system and said layer file folder is associated with a software development layer of said layered software application, said software development layer representing a unique version of said layered software application, and wherein said layer file folder is for storing classes belonging to a layer of said layered software application;
opening a class file stored in said layer file folder, wherein said class file comprises a text file representing said class of said layered software application, and wherein said class file comprises data describing a method performed as part of said class; and
determining which information in the class file of said layer folder should be loaded into the runtime environment being generated including determining if said method of said class file has been previously loaded into said runtime environment.

10. The method of claim 9, further comprising:
sequencing a group of layer file folders into an ascending hierarchical order from a lowest precedence layer file folder to a highest precedence layer file folder.

11. The method of claim 9, wherein said opening a layer file folder comprises:
opening said layer file folder in an ascending sequence from a group of layer file folders comprising a hierarchical order.

12. The method of claim 9, wherein said determining if said method of said class file has been previously loaded into said runtime environment further comprises:
reading data within said class file to ascertain contents of said class file.

13. The method of claim 9, wherein said determining if said method of said class file has been previously loaded into said runtime environment comprises:
loading said method into said runtime environment if said method has not been previously loaded into said runtime environment.

14. The method of claim 9, wherein said determining if said method of said class file has been previously loaded into said runtime environment comprises:
loading said method into said runtime environment to override a previously loaded version of said method, wherein said previously loaded version of said method is from a lower precedence layer of said layered software application.

15. A system residing in a computer-readable medium for folder and file based management of layers and classes of a layered software application that is being developed into a runtime environment, said system comprising:
a folder manager coupled to a storage area, said folder manager for:
receiving inputs to said system including receiving a portion of code representing a method performed by a class of the layered software application and receiving instructions for storing said class of said layered software application, and
opening a layer file folder within said storage area, said layer file folder for storing information related to a software development layer of said layered software application, said software development layer representing a unique version of said layered software application;
a file manager coupled to said storage area, said file manager for opening a class file stored within said layer file folder, said class file represents said class of said layered software application and said class file for storing a software application class implemented in said software development layer; and a write manager coupled to said storage area, said write manager for writing textual information into said class file of said layer file folder, said textual information defining a said method implemented as part of said class in said software development layer.

16. The system of claim 15, further comprising:

a load manager coupled to said storage area and to a runtime environment, said load manager for reading said textual information from said class file and selectively providing an output from said system to said runtime environment, said output comprising a portion of said textual information.

17. The system of claim 15, wherein said folder manager further comprises:

a sequence information generator configured to automatically associate layer sequence information with each said layer file folder, said layer sequence information representing a hierarchical layer of said layered software application that said layer file folder is associated with.

18. The system of claim 15, wherein said folder manager further comprises:

a sequencer for arranging a plurality of said layer file folders into hierarchical order by means of layer sequence information associated with each said layer file folder.

19. The system of claim 15, wherein said file manager is configured to automatically create a file name for said class file by a reading a portion of said textual information.

20. The system of claim 15, wherein said write manager is configured to write a class header into said class file, said class header comprising information for defining a formalized structure of operation for any methods implemented within said software application class.

* * * * *

UNITED STATES PATENT AND TRADEMARK OFFICE
CERTIFICATE OF CORRECTION

| | | |
|---|---|---|
| PATENT NO. | : 7,752,597 B2 | |
| APPLICATION NO. | : 11/391517 | |
| DATED | : July 6, 2010 | |
| INVENTOR(S) | : Michael Fruergaard Pontoppidan et al. | |

It is certified that error appears in the above-identified patent and that said Letters Patent is hereby corrected as shown below:

In column 17, line 4, in Claim 15, after "defining" delete "a".

Signed and Sealed this
Third Day of May, 2011

David J. Kappos
*Director of the United States Patent and Trademark Office*